May 24, 1949.  A. C. HALTER  2,470,928
SPEED RESPONSIVE MEANS
Filed May 24, 1946   2 Sheets-Sheet 1
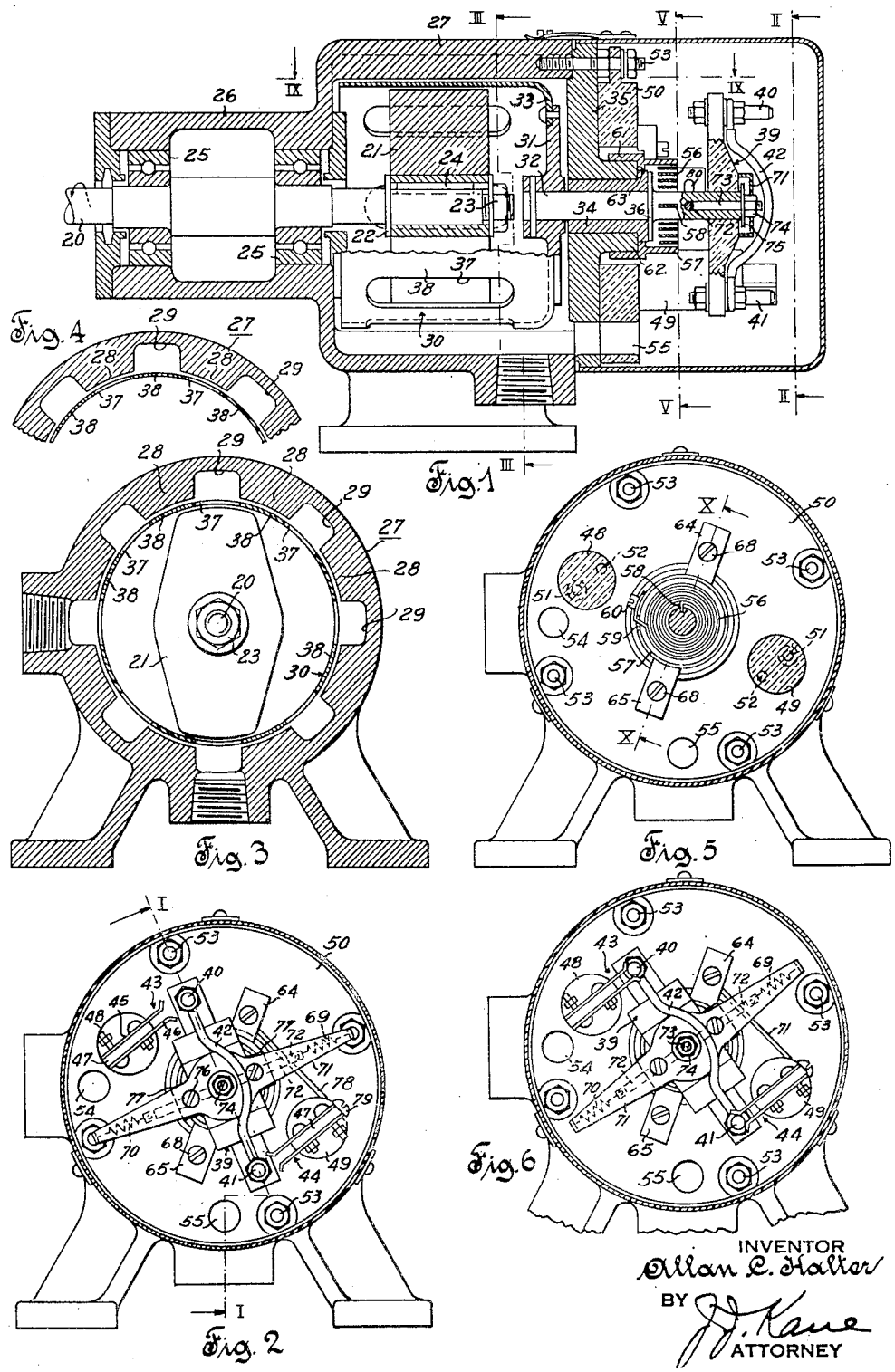

May 24, 1949.　　　　　A. C. HALTER　　　　2,470,928
SPEED RESPONSIVE MEANS

Filed May 24, 1946　　　　　　　　　　　2 Sheets-Sheet 2

INVENTOR
Allan C. Halter
BY
J. J. Kane
ATTORNEY

Patented May 24, 1949

2,470,928

UNITED STATES PATENT OFFICE 2,470,928

SPEED RESPONSIVE MEANS

Allan C. Halter, Milwaukee, Wis., assignor to Allis-Chalmers Manufacturing Company, Milwaukee, Wis., a corporation of Delaware Application May 24, 1946, Serial No. 671,977

13 Claims. (Cl. 200—92)

This invention relates to speed responsive means and more particularly to electric switch means or other control means combined with and actuated by speed responsive means, and the principal object of the invention is the provision of new and improved means of these types.

Another object of the invention is the provision of a speed responsive means which embodies conducting means movement of which is caused by a moving magnetic field, and wherein the power required to move the magnetic field is limited for speeds of movement of the field above a given range; and in which the heat generated in said conducting means is also limited for speeds above said given range.

Another object is the provision of speed responsive means in which a relatively small amount of movement of a speed responsive element is required to actuate a control element and wherein the speed responsive element is permitted to move a predetermined amount after the control element has been actuated, and more specifically, in which this object is combined with the object of limiting the power required and heat generated for speeds above a given range.

Other objects will appear as the description of the invention proceeds.

The novel features of the invention and how the objects are attained will appear from this specification and the accompanying drawings showing one embodiment of the invention and forming a part of this application, and all these novel features are intended to be pointed out in the claims.

In the drawings:

Fig. 1 is a longitudinal sectional view, with certain parts fragmentarily in elevation, of a speed responsive switch embodying the invention, taken on the line I—I of Fig. 2;

Fig. 2 is a sectional view taken on the line II—II of Fig. 1, looking in the direction of the arrows;

Fig. 3 is a sectional view taken on the line III—III of Fig. 1, looking in the direction of the arrows;

Fig. 4 is a fragmentary sectional view, similar to Fig. 3, but with the parts in a different position;

Fig. 5 is a sectional view taken on the line V—V of Fig. 1, looking in the direction of the arrows;

Fig. 6 is a partly fragmentary view, similar to Fig. 2, but with the parts shown in the position in which the speed responsive element has moved the switch contacts into initial engagement;

Figure 7:
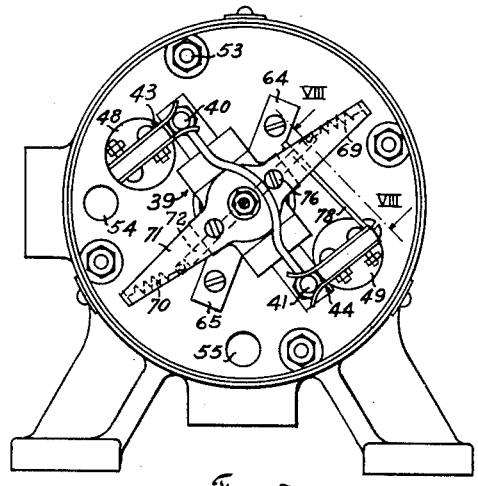
Fig. 7 is a view similar to Fig. 2 but with the parts shown in the position in which the switch contacts are fully engaged and the speed responsive element has continued to move a predetermined amount.

Referring to the drawings, and first more particularly to Figs. 1, 2, 3 and 5, the embodiment of the invention there shown comprises a rotor shaft 20 for driving a rotor magnet 21 here shown as bipolar and desirably providing a north magnetic pole at one end and a south magnetic pole at the other. The rotor magnet 21 is held against a collar 22 on the rotor shaft 20 by a nut 23 threaded on the free end of the rotor shaft 20, and a key 24 is provided positively to prevent turning of the rotor magnet 21 about the shaft 20.

The rotor shaft 20 is rotatably supported by a pair of ball bearings 25 in turn supported in a bearing housing 26 here shown as forming part of a main housing 27. The left hand end of the rotor shaft 20 is shown as broken away, this end being coupled in any suitable way to a rotating member to the speed of which it is desired that the rotor magnet 21 shall respond. The apparatus is designed for rotation of the shaft 20 in the direction indicated by the curved arrow, but it may be designed for rotation in the opposite direction.

The main housing 27 constitutes a stator of magnetic material having a plurality of poles 28 here shown as formed by a plurality of longitudinally extending slots 29 (see Fig. 3). The radially inner ends of the poles 28 define a cylindrical surface; and the free ends of the rotor magnet 21 are here shown as of arcuate form defining a cylindrical surface concentric with and spaced radially within the cylindrical surface defined by the poles 28.

Mounted for rotation radially within and concentric with the cylindrical surface defined by the inner ends of the stator poles 28, and radially outside of the cylindrical surface defined by the radially outer ends of the poles of the rotor magnet 21, is a generally cylindrical shell 30 of non-magnetic, electrically conducting material forming a path for the flow of induced current therein. The shell 30 is here shown as supported by a flange 31 pinned to a shaft 32, the shell having a radially inwardly extending flange 33 fastened by screws, or in any suitable way, to the flange 31.

The shaft 32 is rotatable in a bearing bushing 34 supported by an end flange 35, of any suitable material, held to the right hand end of the main housing 27 as will appear. End play of the shaft 32 is limited by the flange 31 and a collar 36 on the shaft 32, respectively engageable with opposite ends of the bearing 34.

The cylindrical shell 30 may, as here shown, have an axial length substantially the same as the axial length of the poles 28. The shell 30 has a plurality of circumferentially spaced longitudinal slots 37, leaving intermediate bars 38, of such length and position that the ends of the slots 37 are spaced a desired distance from the respective ends of the cylindrical shell 30, as may be clearly seen in Figs. 1 and 9.

Desirably, the axial width of the rotor magnet 21, as may be seen in Fig. 1, is substantially less than the length of the slots 37, and the slots and rotor magnet are relatively so positioned that the mid-plane of the magnet, transverse to the axis of the shaft 20, is approximately midway between the ends of the slots.

Preferably, as may be best seen in Fig. 3, the poles 28 are equally circumferentially spaced, and the slots 37 are equally circumferentially spaced, and the number of poles 28 is equal to the number of slots 37. As here shown the slots 29 are somewhat narrower circumferentially than the poles 28, and the bars 38 and slots 37 are approximately the same circumferential width as the poles 28 and slots 29 respectively. The number of poles 28 as well as the number of bars 38 is here shown as eight, but may be any other desired, suitable number.

Rotation of the shell 30 is adapted to rotate any element that it may be desired to actuate thereby, such as a contact carrying arm 39 through a lost motion connection as will fully appear. The contact carrying arm 39 is of insulating material and has fastened, at its ends, in any suitable way, a pair of stud contacts 40, 41 projecting laterally therefrom. The contacts 40, 41 are electrically connected by a jumper conductor 42.

Referring to Fig. 2, predetermined counter-clockwise rotation of the contact carrying arm 39 from the position there shown will cause the stud contacts 40, 41 to engage stationary contacts 43, 44 respectively, as shown in Fig. 6. Each stationary contact 43, 44 comprises a pair of spaced spring contacts 45, 46, having slightly flared free ends, suitably fastened to and on opposite sides of a flat projection 47 on respective insulating supports 48, 49 projecting laterally from an insulating plate 50. Each support 48, 49 is fastened by a screw 51 to the plate 50 and held from turning by a pin 52 (see also Fig. 3). The plate 50 bears against the end flange 35 and it, as well as the flange, are fastened to the housing 27 by screw studs 53 extending through the plate 50 and flange 37 and threaded into the housing 27.

A conductor (not shown) may be connected to the contact 43 and led through registering openings 54 in the plate 50 and flange 35 and thence out of the housing 27. In like manner a conductor (not shown) may be connected to the contact 44 and led through registering openings 55 in the plate 50 and flange 35 and thence out of the housing 27. The conductors connected to the contacts 43, 44 may be connected, for example, to a contactor for controlling the field winding of a dynamo electric machine, which may have its shaft drivingly connected to the shaft 20; or the contacts 43, 44 may be connected to any other device it may be found desirable to control in response to a speed condition.

Rotation of the shell 30 and associated shaft 32 is resisted by a biasing spring 56 herein termed the return spring. The return spring 56 is here shown (Figs. 1 and 5) as of spiral form disposed about the shaft 32 in a generally cylindrical spring holder 57, the inner end of the spring being bent inwardly and disposed in a recess 58 in the shaft 32. The outer end of the spring 56 is bent outwardly through an aperture 59 in the spring holder 57, and then bent circumferentially against the outside of the spring holder 57 and held in that position by a screw 60 threaded into the spring holder.

The spring holder 57 has a generally cylindrical extension 61 the inner periphery of which rotatably fits a central boss 62 on the end flange 35. Axial movement of the spring holder 57 toward the left, as viewed in Fig. 1, is stopped by engagement of an inwardly extending flange 63 on the spring holder, which engages the end of the boss 62.

Figure 10:
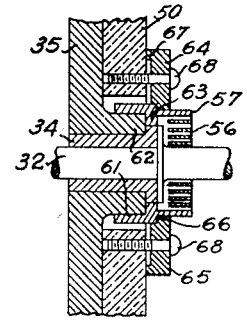
Fig. 10 is a fragmentary sectional view taken on the line X—X of Fig. 5, looking in the direction of the arrows.

The spring holder 57 may be held in any adjusted rotative position by a pair of clamps 64, 65. Referring especially to Fig. 10, each clamp 64, 65 comprises an end portion engaging an annular shoulder 66 on the spring housing 57; and comprises a lateral projection 67 engaging the face of the plate 50. Between its ends each clamp 64, 65 has an aperture through which a screw 68 extends freely, the screw being threaded into the plate 50. It will be evident that the tension of the spring 56 tending to bias the shaft 32 clockwise, as viewed in Fig. 5, may be adjusted by loosening the screws 68, then turning the spring holder 57 to the rotative position giving the desired spring tension, and then tightening the screws 68.

The contact carrying arm 39 is freely rotatable about the right hand end of the shaft 32, but is biased to a neutral position with respect to the shaft by means which includes springs 69, 70 herein termed recall springs. The recall springs 69, 70 are here shown as of helical form and one end of each spring is connected to a respective end of a yoke 71 here shown as of channel shaped cross section. The other ends of the recall springs 69, 70 are connected to the respective ends of a pin 72 extending through the shaft 32 and fastened in position by a set screw 73 threaded axially into the end of the shaft 32, the set screw being held by a lock nut 74 bearing against the end of the shaft 32. A washer 75 serves to keep the contact carrying arm 39 on the shaft 32.

Figure 9:
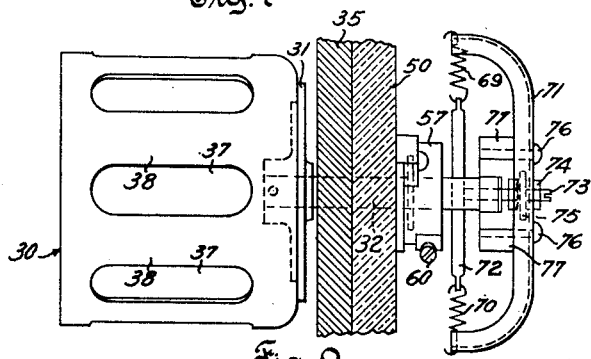
Fig. 9 is a fragmentary view taken on the line IX—IX of Fig. 1, looking in the direction of the arrows.

As may be seen in Fig. 1, the margins of the flange portions of the central part of the channel-section yoke 71 bear against the outer face of the central portion of the contact carrying arm 39, and the yoke is held in position by screws 76 threaded into lateral projections 77 on the contact carrying arm as may be seen in Figs. 2 and 9 for example. The central part of the yoke 71 has an aperture to permit access to the lock nut 74.

The pin 72 being to the left of the contact carrying arm 39, the yoke 71 is here shown as of generally arcuate form (Fig. 9), the ends of the yoke to which the recall springs 69, 70 are connected extending toward the left from the central portion of the yoke, so that the ends of the yoke are in alignment with the line defined by the pin 72.

Rotative movement of the shaft 32, and hence of the shell 30, is stopped in a predetermined clockwise position and a predetermined counterclockwise position by a stop bracket 78 fastened, as here shown, to the support 49, by a screw 79. The stop bracket 78 has a slot 80 (Fig. 8) through which one end of the pin 72 extends. When the counterclockwise torque on the shaft 32 is zero or below a predetermined amount, the return spring 56 holds the shaft in an initial position in which the pin 72 engages the end of the slot 80 nearest the support 49. When the counterclockwise torque on the shaft is sufficient to overcome the bias of the return spring 56, the shaft 32 is rotated to a limiting position in which the pin 72 is moved against the end of the slot farthest from the support 49, as in Fig. 8. The construction and arrangement is such that when the shaft 32 is in the aforesaid initial position, the bars 38 of the shell 30 are in substantial registry with the ends of the poles 28 as shown in Fig. 3, whereas when the shaft is in the aforesaid limiting position, the bars 38 are in substantial registry with the slots 29 in the stator as shown in Fig. 4.

The operation of the apparatus is as follows. If the shaft 20 is at rest, the parts will be in the position shown in Figs. 1, 2 and 3. When the shaft 20 begins to rotate counterclockwise as viewed in Fig. 3, the rotor magnet 21 will rotate in the same direction and magnetic flux provided by the poles of the rotor magnet and extending into the stator 27 will cut the bars 38 of the shell, thereby inducing electromotive force and resultant electric current flow in the shell. The magnetic flux and the induced current react with each other to exert a torque on the shell 30 tending to rotate the shell in a counterclockwise direction. Rotation of the rotor magnet 21 will be most effective to produce torque on the shell 30 when the shell is in the initial position shown in Fig. 3, because then, as a pole of the rotor magnet passes a pole 28 of the stator, a maximum amount of flux will cut a bar 38 of the shell.

As the speed of the rotor magnet 21 increases the torque produced on the shell 30 will, at a predetermined speed, be sufficient to overcome the biasing action of the return spring 56. The resultant turning of the shell 30 will cause the contact carrying arm 39 to turn in unison with the shaft 32 by reason of the connection of the pin 72 through the recall springs 69, 70 and yoke 71 to the arm 39. Predetermined turning movement of the shell 30 will cause the movable contacts 40, 41 to engage the stationary contacts 43, 44 as shown in Fig. 6, so that the circuit to which the stationary contacts 43, 44 are connected is closed. When the speed of the rotor magnet 21 increases, the shell 30 and the shaft 32 will be turned further counterclockwise until the pin 72 engages the end of the slot 80 as shown in Fig. 8, the parts being then in the position shown in Fig. 7. In this position the movable contacts 40, 41 have been forced slightly in between the spring parts 45, 46 of the respective stationary contacts 43, 44, and the shell 30, and the pin 72, have moved angularly more than the contact carrying arm 39, thereby stretching the recall springs 69, 70, such additional angular movement being possible by the reason of the lost motion connection between the shaft 32 and the contact carrying arm 39.

Figure 8:
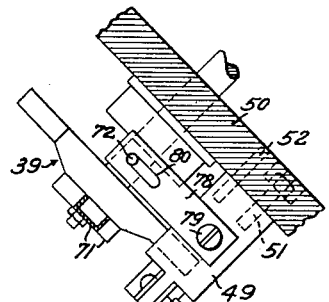
Fig. 8 is a fragmentary view, showing a detail, taken on the line VIII—VIII of Fig. 7.

When the parts shown in Fig. 7 are in the position there shown, the shell 30 is in the position shown in Fig. 4. In this position of the shell 30 the amount of the rotating field which is effective to cause rotation of the shell is reduced to a minimum, because the bars 38 are opposite the slots 29. Hence the electric current induced in the shell 30 is reduced, and thus the heating effect is limited. The electric currents induced in the shell 30 and reacting with the rotating field provided by the rotor magnet 21 act as a drag on the rotor magnet so that power is required to turn the rotor magnet. However, the power is limited by reason of the relatively small amount of flux effective to produce torque on the shell 30 when the shell is in the position shown in Fig. 4.

From the foregoing it will be apparent that when the speed of the rotor magnet 21 is relatively low, substantially all of the flux provided by the rotor magnet is effective to produce torque on the shell 30, and a relatively small rotation of the shell is necessary to cause the movable contacts 40, 41 to engage the stationary contacts 43, 44. As the speed of the rotor magnet 21 increases, the torque produced on the shell 30 does not increase with the speed, as would be the case if no means were provided to reduce the amount of flux effective to produce torque, but, instead, less and less flux becomes effective to produce torque, until the position of Fig. 4 is reached where a minimum amount of flux is effective to produce torque. Thus, apparatus embodying the invention may be used where the normal speed of the machine which drives the shaft 20 is much higher than the maximum speed of the range of speed adjustment of the apparatus, without resulting in excessive driving power requirements or excessive heating.

It will be evident that if the speed of the shaft 20 falls to a predetermined value, insufficient to overcome the bias of the return spring 56, the shaft 32 and the pin 72 will rotate clockwise as viewed in Fig. 7, to the position shown in Fig. 2, and the pin 72 will cause the recall springs 69, 70 to pull the contacts 40, 41 out of engagement with the contacts 43, 44, thereby returning these parts also to the position shown in Fig. 2.

Figure 11:
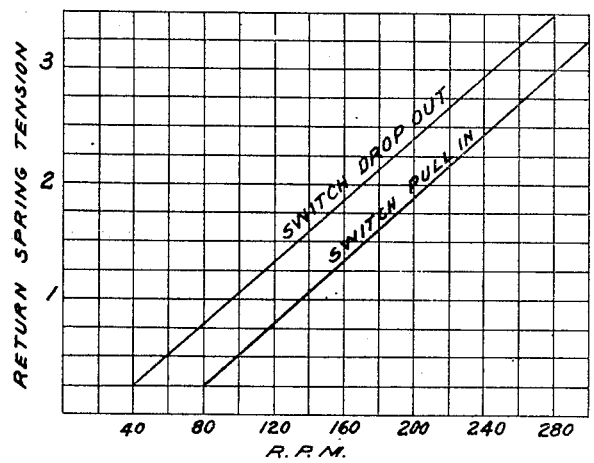
Fig. 11 is a graph illustrating the performance characteristics of an embodiment of the invention.

Referring to Fig. 11, the graph there shown relates to an embodiment of the invention in which the maximum speed of the adjustment range, shown in the graph, is about 300 R. P. M., whereas the machine for driving the shaft may have a normal speed of 700 R. P. M. or more. The tension of the return spring 56 is indicated by the ordinates, in units 1, 2, 3. The speed is indicated by the abscissae in R. P. M. When the spring tension is, for example, ¼ unit, the movable contacts 40, 41 will engage the stationary contacts 43, 44 when the speed of the shaft reaches 80 R. P. M. as indicated by the line marked "Switch pull in." The contacts will of course remain in engagement when the speed increases above 80 R. P. M. For this same spring tension the contact carrying arm 39 will rotate clockwise, thereby disengaging the movable contacts 40, 41 from the stationary contacts 43, 44 when the speed of the shaft 20 falls to or below 40 R. P. M., as indicated by the line marked "Switch drop out." The speeds at which the switch will pull in and drop out are indicated in Fig. 11 for any tension of the return spring 56. It will be noted that the "Switch pull in" and "Switch drop out" lines are parallel. It will be understood that the foregoing numerical values have been given by way of illustration and not by way of limitation, since other embodiments of the invention may be designed for different specific characteristics, while embodying the same fundamental principles.

While in the illustrated embodiment of the invention the contacts 40, 41 are out of engagement with the stationary contacts 43, 44 when the shaft 20 is at rest, it will be evident to those skilled in the art that the construction and arrangement could be such that the relatively movable and stationary contacts are in engagement when the shaft 20 is at rest.

It will be obvious to those skilled in the art that the illustrated embodiment of the invention may be variously changed and modified, or features thereof singly or collectively, embodied in other combinations than those illustrated without departing from the spirit of the invention, or sacrificing all of the advantages thereof, and that, accordingly, the disclosed embodiment is illustrative only, and the invention is not limited thereto.

It is claimed and desired to secure by Letters Patent:

1. In combination: electrically conducting means mounted for rotation; an element actuatable by rotation of said conducting means; means for biasing said conducting means in a given direction to an initial position; means for providing a rotating magnetic field, so constructed and arranged that a predetermined speed of rotation of said field causes induction of current in said conducting means resulting in rotation of said conducting means against said biasing means to move said element from said initial position to a predetermined position; and means causing reduction in the amount of said field effective to cause rotation of said conducting means in response to rotation of said conducting means.

2. In combination: electrically conducting means mounted for rotation; an element actuatable by rotation of said conducting means; means for biasing said conducting means in a given direction to an initial position; means for providing a rotating magnetic field, so constructed and arranged that a predetermined speed of rotation of said field causes induction of current in said conducting means resulting in rotation of said conducting means against said biasing means to move said element from an initial position; means responsive to rotation of said conducting means away from its initial position, constructed and arranged to cause reduction in the amount of said field effective to cause rotation of said conducting means; and means for stopping rotation of said conducting means in a limiting position in which said effective field is a minimum.

3. In combination: electrically conducting means mounted for rotation; an element actuatable by rotation of said conducting means; means for biasing said conducting means in a given direction; means for providing a rotating magnetic field, so constructed and arranged that a predetermined speed of rotation of said field causes induction of current in said conducting means resulting in rotation of said conducting means against said biasing means to move said element from an initial position; means for stopping rotation of said conducting means in said given direction in an initial position in which the amount of said field effective to cause said rotation of said conducting means is at a maximum; means responsive to rotation of said conducting means away from its initial position, constructed and arranged to cause reduction in the amount of said field effective to cause rotation of said conducting means; and means for stopping rotation of said conducting means in a limiting position in which said effective field is a minimum.

4. In combination: electrically conducting means mounted for rotation; an element mounted for rotation; a lost motion connection between said conducting means and said element; means for biasing said conducting means to an initial position; resilient means mechanically connecting said conducting means and said element, constructed and arranged to bias said element to a neutral position with respect to said conducting means; means for providing a rotating magnetic field, so constructed and arranged that a predetermined speed of rotation of said field causes induction of current in said conducting means resulting in rotation of said conducting means against said biasing means to move said element from an initial position; means responsive to rotation of said conducting means away from its initial position, constructed and arranged to cause reduction in the amount of said field effective to cause rotation of said conducting means; and means for stopping rotation of said conducting means in a limiting position in which said effective field is a minimum.

5. In combination: a stator of magnetic material having a generally cylindrical peripheral surface provided with circumferentially spaced longitudinal slots providing poles therebetween; a generally cylindrical shell mounted for rotation adjacent said poles, said shell being made of electrically conducting material forming a path for the flow of induced current therein and having circumferentially spaced slots; an element actuatable by rotation of said shell; means for biasing said shell to an initial position; and magnetic flux-providing rotor means so constructed and arranged that said flux cuts the slotted portion of said shell upon rotation of said rotor means.

6. In combination: a stator of magnetic material having a generally cylindrical inner peripheral surface provided with circumferentially spaced longitudinal slots providing poles therebetween; a generally cylindrical shell within said inner peripheral surface and mounted for rotation adjacent said poles, said shell being made of electrically conducting material forming a path for the flow of induced current therein and having circumferentially spaced slots; an element actuatable by rotation of said shell; means for biasing said shell to an initial position; and magnetic flux-providing rotor means, mounted for rotation within said shell, so constructed and arranged that said flux cuts the slotted portion of said shell upon rotation of said rotor means.

7. In combination: a stator of magnetic material having a generally cylindrical peripheral surface provided with equally circumferentially spaced longitudinal slots providing poles therebetween; a generally cylindrical shell mounted for rotation adjacent said poles, said shell being made of electrically conducting material forming a path for the flow of induced current therein and having equally circumferentially spaced slots, the number of said slots being equal to the number of said poles; an element actuatable by rotation of said shell; means for biasing said shell to an initial position; and magnetic flux-providing rotor means so constructed and arranged that said flux cuts the slotted portion of said shell upon rotation of said rotor means.

8. In combination: a stator of magnetic material having a generally cylindrical peripheral surface provided with equally circumferentially spaced longitudinal slots providing poles therebetween; a generally cylindrical shell mounted for rotation adjacent said poles, said shell being made of electrically conducting material forming a path for the flow of induced current therein and having equally circumferentially spaced slots, the number of said slots being equal to the number of said poles; an element actuatable by rotation of said shell; means for biasing said shell in a given direction; magnetic flux-providing rotor means so constructed and arranged that said flux cuts said shell upon rotation of said rotor means and causes rotation of said shell against said biasing means in the opposite direction; means for stopping rotation of said shell in said given direction in an initial position in which the slots in said shell are in approximate registry with the slots in said stator; and means for stopping rotation of said shell in the opposite direction in a limiting position in which the slots in said shell are in approximate registry with said poles.

9. In combination: a stator of magnetic material having a generally cylindrical peripheral surface provided with circumferentially spaced longitudinal slots providing poles therebetween; a generally cylindrical shell mounted for rotation adjacent said poles, said shell being made of electrically conducting material forming a path for the flow of induced current therein and having circumferentially spaced slots; a first element actuatable by rotation of said shell; means for biasing said shell to an initial position; a second element engageable by said first element upon predetermined rotation of said shell; lost motion connection means between said shell and said first element, so constructed and arranged that said shell may continue to rotate a predetermined angular amount after said first element engages said second element; and magnetic flux-providing rotor means so constructed and arranged that said flux cuts the slotted portion of said shell upon rotation of said rotor means.

10. In combination: electrically conducting means mounted for rotation; an element actuatable by rotation of said conducting means, means for biasing said conducting means in a given direction to an initial position; means for providing a rotating magnetic field, so constructed and arranged that a predetermined speed of rotation of said field causes induction of current in said conducting means resulting in rotation of said conducting means against said biasing means to move said element from said initial position to a predetermined position; means for stopping rotation of said conducting means in said given direction in said initial position, in which the amount of said field effective to cause said rotation of said conducting means is at a maximum; and means causing reduction in the amount of said field effective to cause rotation of said conducting means in response to rotation of said conducting means.

11. In combination: a stator of magnetic material having a generally cylindrical peripheral surface provided with circumferentially spaced longitudinal slots providing poles therebetween; a generally cylindrical shell mounted for rotation adjacent said poles, said shell being made of electrically conducting material forming a path for the flow of induced current therein and having circumferentially spaced slots; an element actuatable by rotation of said shell, means for biasing said shell in a given direction to an initial position, magnetic flux-providing rotor means so constructed and arranged that said flux cuts the slotted portion of said shell upon rotation of said rotor means in the opposite direction and causes rotation of said shell against said biasing means; and means for stopping rotation of said shell in the opposite direction in a limiting position in which the slots in said shell are in approximate registry with said poles, to cause reduction in the amount of said field effective to cause rotation of said shell.

12. In combination: a stator of magnetic material having a generally cylindrical peripheral surface provided with circumferentially spaced longitudinal slots providing poles therebetween; a generally cylindrical shell mounted for rotation adjacent said poles, said shell being made of electrically conducting material forming a path for the flow of induced current therein and having circumferentially spaced slots; an element actuatable by rotation of said shell; means for biasing said shell in a given direction to an initial position; magnetic flux-providing rotor means so constructed and arranged that said flux cuts the slotted portion of said shell upon rotation of said rotor means in the opposite direction and causes rotation of said shell against said biasing means; and means for stopping rotation of said shell in said given direction in said initial position in which the slots in said shell are in approximate registry with the slots in said stator to cause the amount of said field effective to cause rotation of said conducting means to be at a maximum.

13. In combination: a stator of magnetic material having a generally cylindrical peripheral surface provided with circumferentially spaced longitudinal slots providing poles therebetween; a generally cylindrical shell mounted for rotation adjacent said poles, said shell being made of electrically conducting material forming a path for the flow of induced current therein and having circumferentially spaced slots; an element actuatable by rotation of said shell; means for biasing said shell in a given direction to an initial position; magnetic flux-providing rotor means so constructed and arranged that said flux cuts the slotted portion of said shell upon rotation of said rotor means in the opposite direction and causes rotation of said shell against said biasing means; means for stopping rotation of said shell in said given direction in said initial position in which the slots in said shell are in approximate registry with the slots in said stator to cause the amount of said field effective to cause rotation of said conductive means to be at a maximum, and means for stopping rotation of said shell in the opposite direction in a limiting position in which the slots in said shell are in approximate registry with said poles, to cause reduction in the amount of said field effective to cause rotation of said shell.

ALLAN C. HALTER.

REFERENCES CITED

The following references are of record in the file of this patent:

UNITED STATES PATENTS

| Number | Name | Date |
|---|---|---|
| 1,227,185 | Neuland | May 22, 1917 |
| 2,141,278 | Owens | Dec. 27, 1938 |
| 2,206,696 | Hall | July 2, 1940 |
| 2,248,495 | Dupy | July 8, 1941 |